United States Patent
Koti et al.

(10) Patent No.: US 8,916,974 B2
(45) Date of Patent: Dec. 23, 2014

(54) METAL DENSITY AWARE SIGNAL ROUTING

(75) Inventors: Karan B. Koti, Belgaum (IN); Veena Prabhu, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/415,532

(22) Filed: Mar. 8, 2012

(65) Prior Publication Data

US 2012/0261824 A1 Oct. 18, 2012

Related U.S. Application Data

(62) Division of application No. 12/546,858, filed on Aug. 25, 2009, now Pat. No. 8,753,900.

(51) Int. Cl.
*H01L 23/48* (2006.01)
*G06F 17/50* (2006.01)
*H01L 23/522* (2006.01)

(52) U.S. Cl.
CPC ........ *G06F 17/5068* (2013.01); *G06F 2217/12* (2013.01); *H01L 23/522* (2013.01)
USPC ............ 257/758; 257/773; 716/119; 716/124

(58) Field of Classification Search
CPC ...................... H01L 27/0207; H01L 29/42372; H01L 2224/131; H01L 2224/32225; H01L 2224/73265; H01L 23/522; H01L 2224/45124; H01L 2924/01029; H01L 2224/06133; H01L 2224/14133; H01L 21/76832
USPC ..................... 257/750–758, 48, 75, 773–776; 716/119, 124–126
See application file for complete search history.

(56) References Cited

U.S. PATENT DOCUMENTS

| | | | |
|---|---|---|---|
| 6,904,581 B1* | 6/2005 | Oh | 716/122 |
| 7,240,314 B1 | 7/2007 | Leung | |
| 7,328,419 B2 | 2/2008 | Vuong et al. | |
| 2003/0071263 A1* | 4/2003 | Kouno et al. | 257/48 |
| 2004/0044983 A1* | 3/2004 | Dillon et al. | 716/21 |
| 2005/0001322 A1* | 1/2005 | Juengling et al. | 257/758 |
| 2005/0028121 A1* | 2/2005 | Shrowty et al. | 716/10 |

(Continued)

OTHER PUBLICATIONS

Subramian et al., Jayathi et al., Performance Impact from Metal Fill Insertion, Freescale Semiconductor, Proceedings from the Cadence Designer Network conference, Session #4.2 (Physical Design), Sep. 2007, Cadence Design Systems, San Jose, United States.

Kundu, Sandip, One-day Seminar on Design for Manufacturability and Reliability (Summary only), VLSI Design and Test Symposium, May 31, 2007, VLSI Society of India, Bangalore, India.

(Continued)

*Primary Examiner* — H Tsai
(74) *Attorney, Agent, or Firm* — Patterson & Sheridan, LLP (57) ABSTRACT

Methods and apparatus for routing signal paths in an integrated circuit. One or more signal routing paths for transferring signals of the integrated circuit may be determined. A dummy fill pattern for the integrated circuit may be determined based on the one or more metal density specifications and at least one design rule for reducing cross coupling capacitance between the dummy fill pattern and the routing paths. The signal routing paths and/or the dummy fill pattern may be incrementally optimized to meet one or more timing requirements of the integrated circuit.

10 Claims, 7 Drawing Sheets

(56) References Cited

U.S. PATENT DOCUMENTS

| | | |
|---|---|---|
| 2007/0214446 A1 | 9/2007 | Lavin et al. |
| 2008/0120586 A1 | 5/2008 | Hoerold |
| 2008/0163150 A1 | 7/2008 | White et al. |
| 2009/0031261 A1 | 1/2009 | Smith et al. |
| 2009/0031267 A1 | 1/2009 | Ueki |
| 2009/0205850 A1 | 8/2009 | Chow et al. |
| 2011/0049721 A1 | 3/2011 | Koti et al. |
| 2012/0174050 A1 | 7/2012 | Koti et al. |

OTHER PUBLICATIONS

Chen, Tung-Chieh et al., Metal-Density Driven Placement for CMP Variation and Routability, Proceedings of the 2008 international symposium on Physical design, 2008, ACM, New York, United States.

Cho, Minsik et al., Wire Density Driven Global Routing for CMP Variation and Timing, Proceedings of the 2006 IEEE/ACM international conference on Computer-aided design, 2006, ACM, New York, United States.

\* cited by examiner

METAL DENSITY AWARE SIGNAL ROUTING

CROSS-REFERENCE TO RELATED APPLICATIONS

This application is a divisional of co-pending U.S. patent application Ser. No. 12/546,858, filed Aug. 25, 2009. The aforementioned related patent application is herein incorporated by reference in its entirety.

BACKGROUND OF THE INVENTION

1. Field of the Invention

Embodiments of the invention are generally related to fabrication of integrated circuit devices, and more specifically to routing of signals in an integrated circuit.

2. Description of the Related Art

Fabrication of integrated circuits generally involves depositing multiple layers of metal and insulation materials selectively on a silicon wafer. Particularly, the insulation (or dielectric) layers may be deposited between metal layers and may provide electrical insulation therebetween. The metal layers may connect one or more devices of the integrated circuit. In some cases, the metal layers may be interconnected to each other through vias etched in the intervening dielectric layers to route one or more signals of the integrated circuit.

The dielectric layers of an integrated circuit may vary in thickness as a result of various patterning processes that may be performed while forming the vias and patterned metal layers. Such thickness variations may be undesirable because they may reduce yield during fabrication of the integrated circuits and adversely affect performance of the integrated circuit.

In some cases, metal dummy fill structures may be provided in low metal density areas to produce a more flattened layout. The dummy fill structures may be formed as metal squares or metal rectangles that equalize spatial density of metal, thereby making the topology of metal layers more uniform and reducing the undesired variations in thicknesses of the dielectric layers. The metal dummy fill structures are generally formed in a final physical design step that is performed after a routing step which determines placement of signal lines that transfer signals in the integrated circuit.

SUMMARY OF THE INVENTION

Embodiments of the invention are generally related to fabrication of integrated circuit devices, and more specifically to routing of signals in an integrated circuit.

One embodiment of the invention provides a method for forming an integrated circuit. The method generally comprises determining one or more electrical characteristics of at least one of cells and one or more metal layers defined on an integrated circuit, and receiving one or more metal density specifications, wherein the metal density specifications define parameters for determining a dummy fill pattern for the integrated circuit. The method further comprises forming one or more signal routing paths for transferring signals of the integrated circuit, wherein the signal routing paths are determined based on the one or more electrical characteristics, and forming the dummy fill pattern for the integrated circuit based on the one or more metal density specifications and at least one design rule for reducing cross coupling capacitance between the dummy fill pattern and the signal routing paths. The method also comprises saving the dummy fill pattern in a memory device.

Another embodiment of the invention provides a computer readable storage medium comprising a program product which, when executed, performs an operation for forming an integrated circuit. The operation generally comprises determining one or more electrical characteristics of at least one of cells and one or more metal layers defined on an integrated circuit, and receiving one or more metal density specifications, wherein the metal density specifications define parameters for determining a dummy fill pattern for the integrated circuit. The operation further comprises forming one or more signal routing paths for transferring signals of the integrated circuit, wherein the routing paths are determined based on the one or more electrical characteristics, and forming the dummy fill pattern for the integrated circuit based on the one or more metal density specifications and at least one design rule for reducing cross coupling capacitance between the dummy fill pattern and the signal routing paths. The operation also comprises saving the dummy fill pattern in a memory device.

Yet another embodiment of the invention provides an integrated circuit, comprising one or more signal routing paths for transferring signals and a dummy fill pattern. The one or more signal routing paths are formed based on one or more electrical characteristics of at least one of cells and one or more metal layers defined on the integrated circuit. The dummy fill pattern is determined based on one or more metal density specifications and at least one design rule for reducing cross coupling capacitance between the dummy fill pattern and the one or more signal routing paths. The metal density specifications define parameters for determining a dummy fill pattern for the integrated circuit.

BRIEF DESCRIPTION OF THE DRAWINGS

So that the manner in which the above recited features, advantages and objects of embodiments of the invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention are generally related to fabrication of integrated circuit devices, and more specifically to routing of signals in an integrated circuit. A method and apparatus for designing an integrated circuit are provided. During routing, one or more signal routes for transferring signals of the integrated circuit may be determined. A dummy fill pattern for the integrated circuit may be determined based on the one or more metal density specifications and at least one design rule for reducing cross coupling capacitance between the dummy fill pattern and the routes.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the embodiments of the invention may be embodied as a system, method or computer program product. Accordingly, aspects of embodiments of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
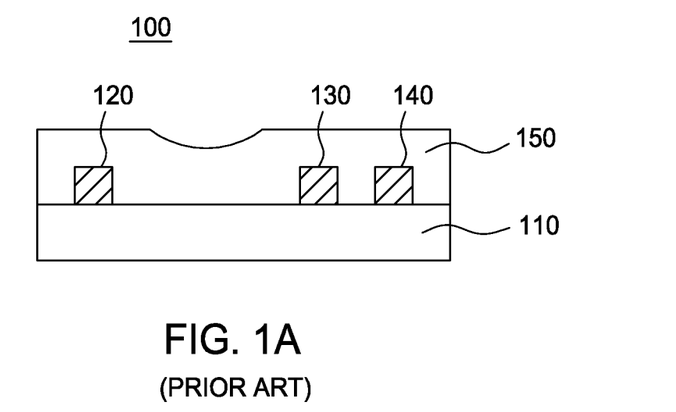
FIG. 1A illustrates an integrated circuit without planarization, according to the prior art.

FIG. 1A illustrates an exemplary integrated circuit 100 according to the prior art. As illustrated in FIG. 1A, the integrated circuit 100 may include a substrate 110 on which a plurality of signal lines, for example, signal lines 120, 130 and 140 have been formed. The signal lines 120, 130, and 140 may be a part of a metal layer that is configured to route one or more signals of the integrated circuit 100.

As illustrated further in FIG. 1A, a dielectric layer 150 may be deposited on the signal lines 120, 130, and 140. The dielectric layer may be formed with a single material, or alternatively, with a plurality of different material layers.

Exemplary materials that may be used to form the dielectric layer may include, for example, silicon dioxide, silicon oxynitride, fluorinated silicate glass, and the like. The dielectric layer may be formed using any reasonable technique, for example, chemical vapor deposition (CVD), spin on glass (SOG), or the like.

As can be seen in FIG. 1A, the dielectric layer 150 may adequately fill the areas between and over the metal lines 130 and 140, which are closely spaced. However, in areas where the metal lines are spaced relatively farther apart, for example, between the metal lines 120 and 130, the dielectric layer may form an indentation, which results in the dielectric layer 150 having a non-planar and non-uniform surface. Such variations in the dielectric layer may remain even after one or more further planarizing steps such as Chemical Mechanical Polishing (CMP), thereby affecting the fabrication of subsequent metal layers.

Figure 1B:
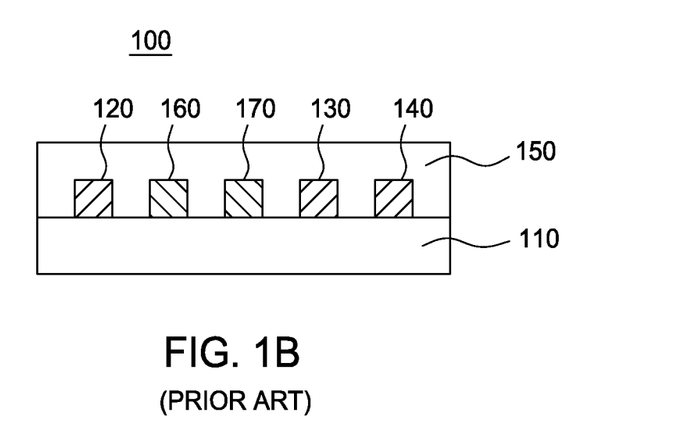
FIG. 1B illustrates an integrated circuit with planarization and metal fill addition, according to the prior art.

Because variations in the thicknesses of the dielectric layers may be undesirable, in some embodiments, metal dummy fill structures may be provided in regions between metal lines that are spaced far apart. FIG. 1B illustrates exemplary dummy patterns 160 and 170 that may be provided in the integrated circuit 100. As illustrated in FIG. 1B, the addition of the metal dummy patterns 160 and 170 may result in the dielectric layer having a more uniform and planar surface.

Including metal dummy fill structures, however, may increase the cross coupling capacitance between metal structures in the integrated circuit. The increase in cross coupling capacitance may adversely affect the timing of signals transferred on the signal lines, for example the signal lines 120, 130, and 140. Accordingly, during timing analysis after routing of signals, it may be desirable to account for the effects of the metal dummy fill structures.

Existing fabrication methods generally involve determining cell delays, resistance and/or capacitance of metal layers, and the like, of an integrated circuit and generating optimum routing to meet one or more timing requirements of the integrated circuit. After the specific tracks for routing signals are determined, an assumption may be made regarding metal density of the integrated circuit, wherein the assumption accounts for potential metal dummy fill structures that may be formed later on during fabrication. For example, it may be determined that metal structures may be formed on 70% of the surface of the integrated circuit.

Thereafter, the one or more electrical characteristics of the routes, for example, resistance and/or capacitance of the routes may be determined again based on the metal density assumption. By making the assumption that metal dummy fill structures may exist, the electrical characteristics of the metal structures that are determined may account for the potential effects of cross coupling capacitance due to the formation of metal dummy fill structures.

For example, based on the measured electrical characteristics of the routes, a further timing analysis may be performed to determine whether the timing requirements of the integrated circuit are met. If so, metal dummy fill structures may be added to the integrated circuit. However, if the timing analysis indicates that the timing requirements of the integrated circuit are not met, then the metal density assumption may be adjusted as long as the metal density assumption is in accordance with predefined metal density requirements. If it is not possible to adjust the metal density assumption to achieve the desired timing, then a new set of routes may be determined for the integrated circuit. The process outlined above may require several iterations of routing and metal density assumptions, which makes it time consuming and tedious.

One particular drawback of the above outlined process is that the assumptions regarding the presence of metal dummy fill structures may not be accurate. The metal density specification for a particular integrated circuit may have a minimum and a maximum density requirement. For example, in one embodiment, the metal density specification may require a metal density between 20% and 70% for a particular metal layer. In other embodiments, any other reasonable minimum and/or maximum threshold for metal density may be established.

In the above example requiring metal density between 20% and 70%, when the metal fills are actually laid out, some areas may have only 35%, while other areas may have 65%. Furthermore, metal fill assumptions generally consider a uniform type of metal fills. For example, the metal fills may be assumed to be floating, non-staggered rectangular metal fills. When metal fills are actually laid out, different areas of the design may have different types of metal fill (floating or connected, staggered or non-staggered, rectangular or square). Each type of metal fill impacts timing on signal routes differently. This metal fill assumptions do not account for such variations.

Figure 2:
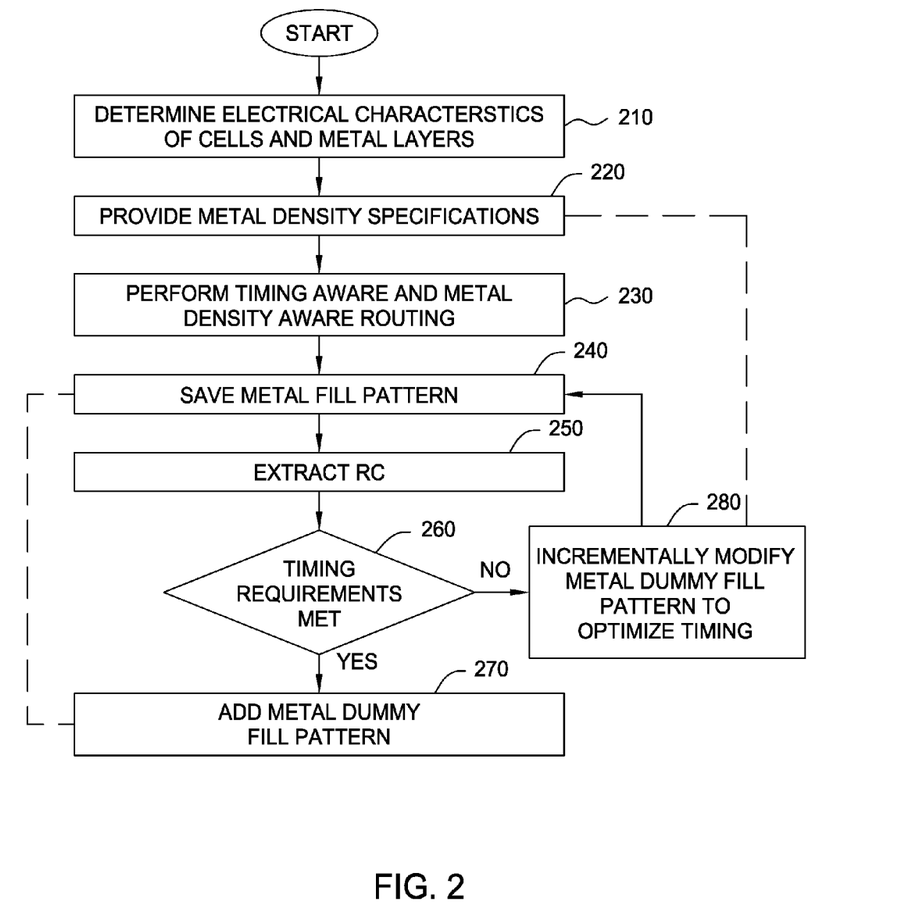
FIG. 2 is a flow diagram of exemplary operations performed during designing of an integrated circuit according to an embodiment of the invention.

Embodiments of the invention provide a metal density aware routing method that may efficiently determine routes for transferring signals and metal dummy fill structures that meet the timing requirements of an integrated circuit. FIG. 2 illustrates a flow diagram of exemplary operations that may be performed, according to an embodiment of the invention. The operations may be performed during a fabrication process of an integrated circuit. Alternatively, the operations may also be performed at a time of designing an integrated circuit using one or more software design tools.

As illustrated in FIG. 2, the operations may begin in step 210 by determining one or more electrical characteristics of cells and metal layers of the integrated circuit. A cell of an integrated circuit may be one or a plurality of predefined regions or areas of the integrated circuit. In some embodiments, cells may be defined around distinct components of the integrated circuit. In one embodiment, the cell delays of the integrated circuit may be computed. Estimating the cell delay time for an integrated circuit cell may involve, for example, computing a capacitive load at an output of the cell with a coefficient that is associated with the operational characteristics of that cell. In addition to the cell delays, in some embodiments, the resistance and capacitance of metal layers of the integrated circuit may also be computed.

In step 220, one or more metal density specifications may be provided. The metal density specifications may describe characteristics and requirements for one or more windows (or regions) that may be defined on a surface of the integrated circuit. In one embodiment, cells of the integrated circuit may be smaller than the windows of the integrated circuit. Accordingly, each window may include a plurality of cells. Exemplary metal density specifications may include for example, window size, minimum and maximum density, instance count thresholds in each window, and the like. The metal density specifications may be used to make decisions regarding formation of metal dummy fill structures in each window, as is described in greater detail below.

In step 230, timing aware and metal density aware routing may be performed. Routing may generally involve determining routes (or signal paths) for transferring signals of the integrated circuit. The routing may involve two stages, i.e., global routing and detailed routing. Global routing may involve dividing a chip into a plurality of regions, and defining signal lines that transfer signals between the regions. In one embodiment of the invention, the regions may correspond to the cells of the integrated circuit. Detailed routing may involve defining signal lines to route signal within each of the defined regions.

In one embodiment, the timing and metal density aware routing may be performed based on a plurality of factors. For example, in a particular embodiment, the timing aware and metal density aware routing may be performed based on the cell delays and the resistance and/or capacitance of the metal layers, as well as the metal density specifications. In general, the goal of the timing and metal density aware routing is to determine both, the optimal routes as well as the metal dummy fill patterns that will meet predefined timing constraints of the integrated circuit.

In one embodiment of the invention the specific location, types, and number of metal dummy fill patterns may be determined for each window on the integrated circuit during the timing aware and metal density aware routing step. For example, in one embodiment, the formation of metal dummy fill patterns in a particular window may be based on the characteristics of the signal routing paths in the window, such that the cross coupling effects of the metal dummy fill pattern is reduced. The timing aware and metal density aware routing is described in greater detail below.

In step 240, the metal dummy fill patterns that are determined in step 230 may be saved. Thereafter, in step 250, a Resistance-Capacitance (RC) is extracted for the integrated circuit. In one embodiment, the RC may be extracted for the IC as a whole. In alternative embodiments, standard cell RCs may be pre-extracted and modeled as cell delays/transition on pins. The RC extraction at IC level may involve determining the resistance and capacitance of the routes connected between cells and also the coupling capacitance between closely placed routes that can affect the delay on other routes placed close by. The IC level RC extraction generally gives an aggregate RC due to the routes, and cell RC obtained from models. The RC may be used to perform timing analysis of the integrated circuit having the routes and dummy fill pattern determined in steps 230. In step 260, if the timing requirements are met, the metal fill pattern that was saved may be added to the integrated circuit in step 270. The metal fill pattern that is added may be the metal fill pattern that is saved in step 240, as illustrated by the dashed line connecting steps 240 and 270.

On the other hand, if the timing requirements are not met in step 260, the metal dummy fill pattern and/or the routes may be incrementally modified to optimize the timing, in step 280. In one embodiment, the modification of routes and/or the metal dummy fill pattern may be done according to the metal density specifications provided in step 220, as indicated by the dashed line connecting steps 220 and 280. Thereafter, the operations may loop back to step 240, as illustrated in FIG. 2. In one embodiment, the operations may loop through steps 240, 250, 260, and 280 until the timing requirements are met in step 260.

In one embodiment of the invention, the metal density specifications, for example, the metal density specifications defined in step 220 of FIG. 2 may include a definition of a window size. As discussed above, a plurality of windows may be defined on a surface of the integrated circuit. Examples of window size may include, e.g., 100 micron by 100 micron, 50 micron by 50 micron, and the like. In alternative embodiments, any reasonable window size may be defined.

Figure 3:
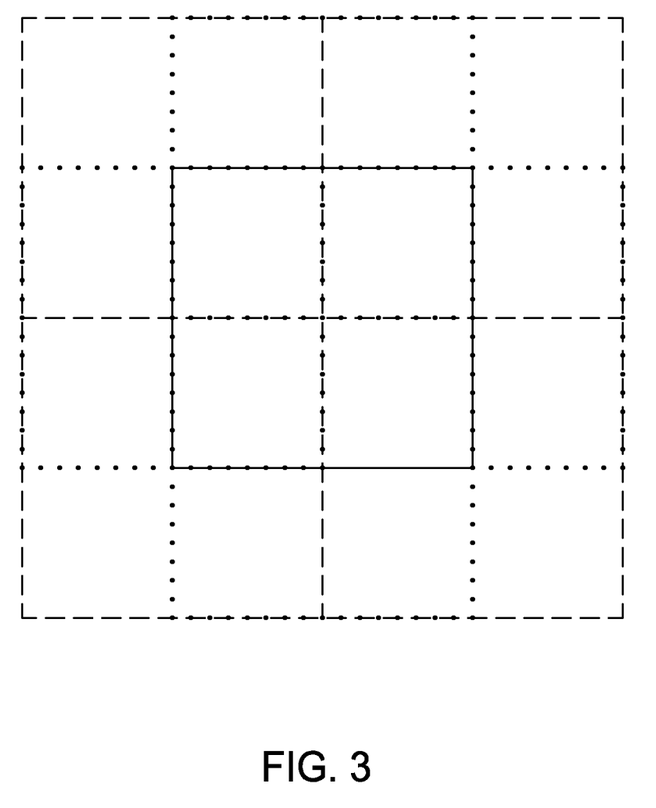
FIG. 3 illustrates exemplary windows that may be defined on an integrated circuit, according to an embodiment of the invention.

In one embodiment of the invention, the metal density specifications may also include a definition of a step size. A step size may define a distance after which a next window starts. For example, with a step size of 1 a plurality of windows may be defined on a surface of the integrated circuit such that the plurality of windows are adjacent to one another and do not overlap each other. FIG. 3 illustrates a plurality of windows defined on a surface of an integrated circuit with a step size of 0.5. As illustrated in FIG. 3, each window, for example, the window formed with a solid line, may have eight associated overlapping windows, for example, the four windows formed by the dashed lines and the four windows formed by the dotted lines in FIG. 3.

Overlapping windows may be advantageously used to take into consideration the coupling effects between the boundary routes of one window and the adjacent window. In other words, if two windows do not overlap and they are adjacent to each other, then the coupling effect while working within each window may be considered, but the effects between the routes on the boundary of one window and routes or added metal fill in another window boundary will not be considered. Therefore, in some embodiments, the windows may be sufficiently overlapped by defining an appropriate step size parameter in the metal density specifications.

In one embodiment of the invention, the metal density specifications may include minimum and/or maximum metal density specifications. In other words, for any given window defined on a surface of the integrated circuit, the minimum and/or maximum metal density specifications may define an upper limit and a lower limit for metal density. The specific metal density for any given window may be determined based on the cross coupling capacitance effects of the metal dummy fill structures.

In some embodiments, the metal density specifications may include an instance count threshold for each window. The instance count may indicate a number of cells that are present in any given window. In other words, the instance count may indicate a congestion level in any given window. In one embodiment of the invention, the instance count within a given window may affect the pattern of the dummy fill structures, as is described below with respect to FIG. 5.

In one embodiment of the invention, the metal dummy fill structures of any reasonable shape may be formed in each window defined on the integrated circuit. In a particular embodiment, the metal dummy fill structures may have a rectangular shape. In one embodiment of the invention, the rectangular metal dummy fill structures may be formed in a window having either a staggered or a non-staggered configuration.

Figure 4A:
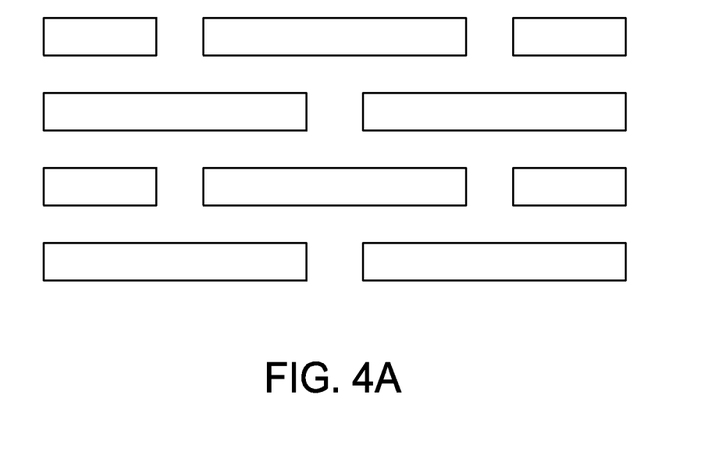
FIGS. 4A and 4B illustrate exemplary dummy fill patterns according to an embodiment of the invention.
Figure 4B:
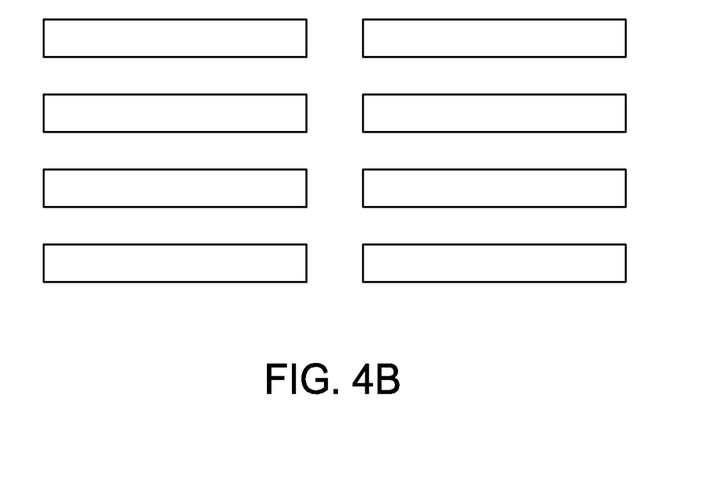

FIGS. 4A and 4B illustrate the staggered and non-staggered configurations of the metal dummy fill structures, respectively. In one embodiment of the invention, the particular configuration of rectangular metal dummy fill structures that may be implemented in a window may depend on one or more characteristics of the window, as is described with respect to FIG. 5 below. In a particular embodiment, staggered rectangular fill structures may be used in windows having timing critical signal paths because the staggered configuration reduces the cross coupling capacitance between the fill structures and the timing critical signal paths.

In one embodiment, rectangular connected non-staggered metal dummy fill structures, as illustrated in FIG. 4B may be used in windows that have a high instance count. This may be because the rectangular connected configuration may reduce the effects of voltage drops that are likely in windows with high instance counts. While rectangular metal dummy fill structures are described hereinabove, in alternative embodiments, the metal dummy fill structures may be formed with any other shape, for example, square, round, oval, and the like.

The metal dummy fill structures may be formed as either connected fill structures or floating fill structures. Connected fill structures may be connected to either power or ground. Connected fill structures may reduce power grid resistance, and therefore may be used in windows where reducing voltage drop in the signal tracks is desired. Floating fill structures may be left unconnected, and may be used in widows that have timing critical routes because the cross coupling capacitance impact of such fills on the signal routes is minimal.

Figure 5:
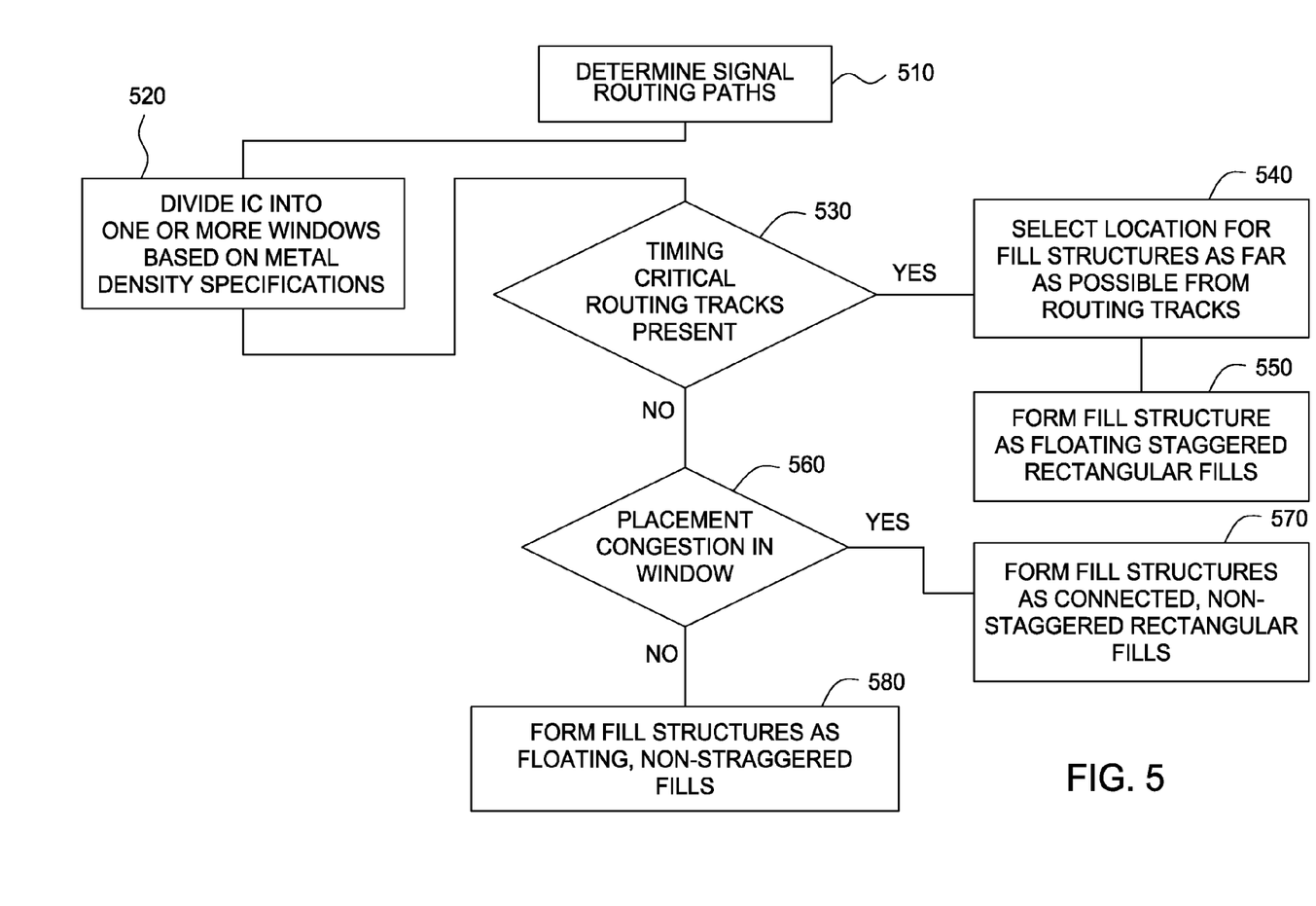
FIG. 5 illustrates a flow diagram of exemplary operations performed during timing aware and metal density aware routing, according to an embodiment of the invention.

FIG. 5 illustrates exemplary steps that may be performed during the timing aware and metal density aware routing, which was referenced above with respect to element 230 of FIG. 2. The operations may begin in step 510 by determining signal routing paths that meet the timing requirements of the integrated circuit. For example, one or more optimum routes (or signal paths) may be defined based on one or more factors such as, for example, shortest path for transferring the signals. Thereafter, an RC of the routes may be retrieved and timing analysis of signals may be performed based on the RC constant to determine whether the timing requirements of the integrated circuit are met.

In one embodiment of the invention, the routing method may involve dividing the integrated circuit into global routing cells and interconnecting the cells using global routes. Detailed routing may also be performed within the global routing cells. Thereafter, the integrated circuit may be divided into one or more windows based on the metal density specifications in step 520 (see also item 220 in FIG. 2).

For each window defined on the integrated circuit, it may be determined whether timing critical routes are present, in step 530. If timing critical routes are present in the window, then in step 540, a location may be selected for forming the metal dummy fill structures, the location being as far as possible (in the window) from the timing critical routes. In windows with timing critical routes, the metal dummy fill structures may be formed as far as possible from the timing critical routes to reduce the effects of cross coupling capacitance, thereby reducing the adverse affect of the dummy structures on the timing of signals in the integrated circuit.

As illustrated further in step 550, in one embodiment, the metal dummy fill structures may be formed as floating, staggered rectangular fill structures. In one embodiment, the length of the rectangular fill structures may be selected such that the cross coupling capacitance between the rectangular fill structures and the timing critical routes is reduced.

If there are no timing critical routes in the window, then in step 560, it may be determined whether there is placement congestion in the window. Placement congestion may exist in a window if the instance count threshold set in the metal density specifications is reached. In windows having high congestion the likelihood of voltage drop in those windows may be high. Accordingly, in one embodiment, in step 570, the metal dummy fill structures may be formed as connected, non-staggered rectangular fill structures if it is determined that the window has high placement congestion. If the window does not have timing critical routes or high placement congestion, the metal dummy fill structures may be formed as floating, non-staggered fill structures, in step 580.

Figure 6:
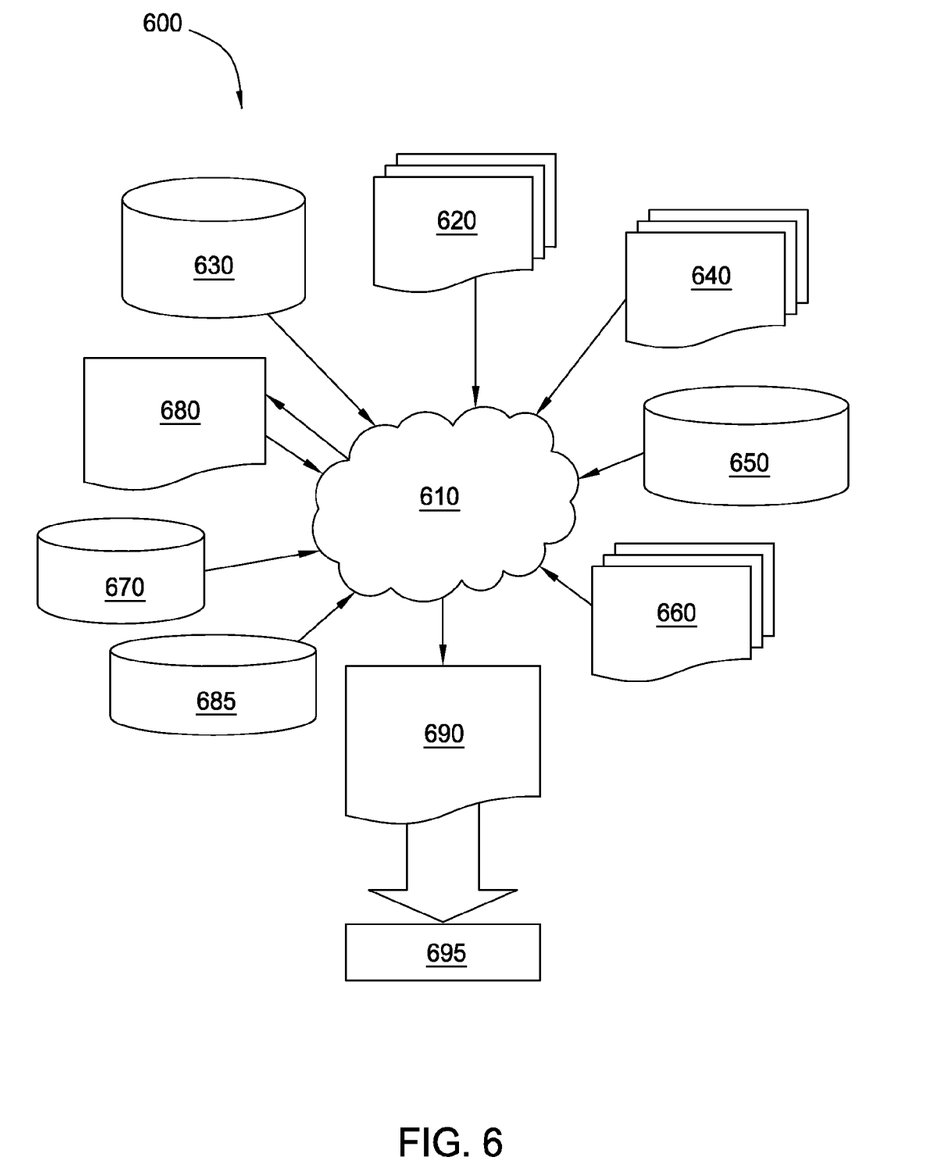
FIG. 6 illustrates an exemplary design flow process according to an embodiment of the invention.

The methods of routing signals and determining metal dummy fill patterns described hereinabove may be performed during fabrication of an integrated circuit. Alternatively, in some embodiment, the methods described above may be performed during design of the integrated circuit using one or more software tools. FIG. 6 shows a block diagram of an example design flow 600. Design flow 600 may vary depending on the type of IC being designed. For example, a design flow 600 for building an application specific IC (ASIC) may differ from a design flow 600 for designing a standard component.

Design structure 620 is preferably an input to a design process 610 and may come from an IP provider, a core developer, or other design company or may be generated by the operator of the design flow, or from other sources. Design structure 620 may describe an integrated circuit in the form of schematics or HDL, a hardware-description language (e.g., Verilog, VHDL, C, etc.). Design structure 620 may be contained on one or more machine readable medium. For example, design structure 1820 may be a text file or a graphical representation of the integrated circuit.

The design process 610 preferably synthesizes (or translates) the integrated circuit into a netlist 680, where netlist 680 is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. The medium may also be a packet of data to be sent via the Internet, or other networking suitable means. The synthesis may be an iterative process in which netlist 680 is resynthesized one or more times depending on design specifications and parameters for the circuit. For example, the synthesis may involve performing the steps outlines with respect to FIGS. 2 and 5 hereinabove.

Design process 610 may include using a variety of inputs; for example, inputs from library elements 630 which may house a set of commonly used elements, circuits, and devices, including models, layouts, and symbolic representations, for a given manufacturing technology (e.g., different technology nodes, 32 nm, 45 nm, 90 nm, etc.), design specifications 640, characterization data 650, verification data 660, design rules 670, and test data files 685 (which may include test patterns and other testing information). In one embodiment, the design rules 670 may include the metal density specifications, as described hereinabove.

Design process 610 may further include, for example, standard circuit design processes such as timing analysis, verification, design rule checking, place and route operations, etc. One of ordinary skill in the art of integrated circuit design can appreciate the extent of possible electronic design automation tools and applications used in design process 610 without deviating from the scope and spirit of the invention. The design structure of the invention is not limited to any specific design flow.

Design process 610 preferably translates an integrated circuit design or data (if applicable), into a second design structure 690. Design structure 690 may reside on a storage medium in a data format used for the exchange of layout data of integrated circuits (e.g. information stored in a GDSII (GDS2), GL1, OASIS, or any other suitable format for storing such design structures).

Design structure 690 may include information such as, for example, test data files, design content files, manufacturing data, layout parameters, wires, levels of metal, vias, shapes, data for routing through the manufacturing line, and any other data required by a semiconductor manufacturer to produce an integrated circuit. In a particular embodiment, the design structure may include the metal dummy pattern fill patterns and signal routing patterns determined in the process described in FIG. 2. Design structure 690 may then proceed to a stage 695 where, for example, design structure 690: proceeds to tape-out, is released to manufacturing, is released to a mask house, is sent to another design house, is sent back to the customer, etc.

Figure 7:
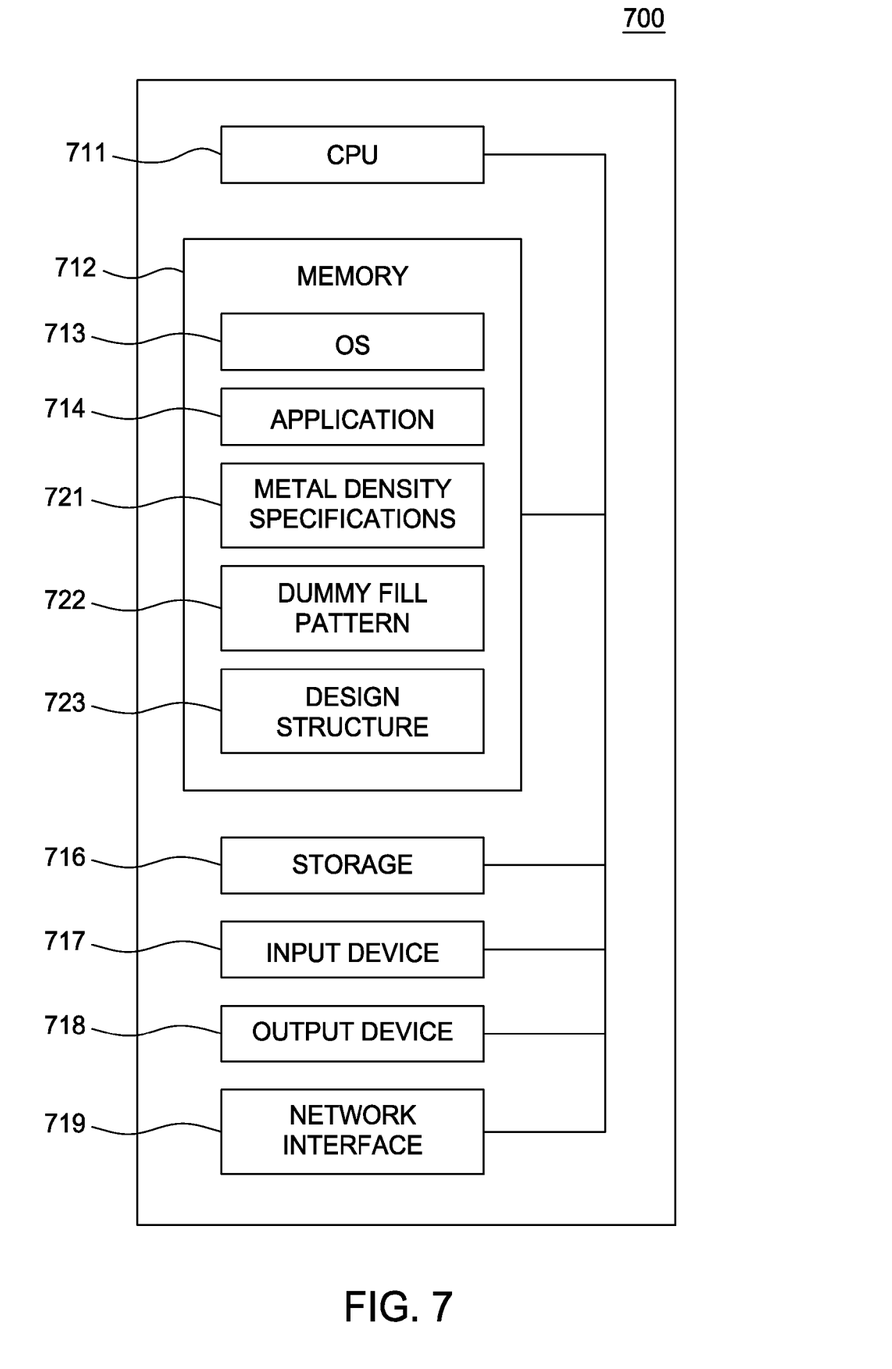
FIG. 7 illustrates an exemplary system according to an embodiment of the invention.

FIG. 7 depicts a block diagram of a computer system 700 according to an embodiment of the invention. In general, the computer system 700 may include a Central Processing Unit (CPU) 711 connected via a bus 771 to a memory 712, storage 716, an input device 717, an output device 718, and a network interface device 719. The input device 717 can be any device to give input to the computer system 700. For example, a keyboard, keypad, light-pen, touch-screen, track-ball, or speech recognition unit, audio/video player, and the like could be used.

The output device 718 can be any device to give output to the user, e.g., any conventional display screen. Although shown separately from the input device 717, the output device 718 and input device 717 could be combined. For example, a display screen with an integrated touch-screen, a display with an integrated keyboard, or a speech recognition unit combined with a text speech converter could be used.

The network interface device 719 may be any entry/exit device configured to allow network communications between the computer system 700 and one or more other devices via a network. For example, the network interface device 719 may be a network adapter or other network interface card (NIC).

Storage 716 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 712 and storage 716 could be part of one virtual address space spanning multiple primary and secondary storage devices.

The memory 712 is preferably a random access memory sufficiently large to hold the necessary programming and data structures of the invention. While memory 712 is shown as a single entity, it should be understood that memory 712 may in fact comprise a plurality of modules, and that memory 712 may exist at multiple levels, from high speed registers and caches to lower speed but larger DRAM chips.

Illustratively, the memory 712 contains an operating system 713. Exemplary operating systems, which may be used to advantage, include Linux (Linux is a trademark of Linus Torvalds in the US, other countries, or both) and Microsoft's Windows®. More generally, any operating system supporting the functions disclosed herein may be used.

Memory 712 may also include an application 714. Applications 714 may be software products comprising a plurality of instructions which, when executed by the CPU 711 are capable of performing operations for designing an integrated circuit, for example, the operations described hereinabove with respect to flow diagrams 2 and 5. The memory 712 is also shown including metal density specifications 721, a metal dummy fill pattern 722, and a design structure 723, which may correspond to the metal density specifications, metal dummy fill pattern, and design structure described with respect to FIGS. 2 and 6 above.

The flowchart and block diagrams in the Figures illustrate the architecture, functionality, and operation of possible implementations of systems, methods and computer program products according to various embodiments of embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

By providing methods that determine metal dummy fill patterns in conjunction with routing paths in predefined windows on an integrated circuit, embodiments of the invention reduce the number of optimization iterations and turn around time required to determine an appropriate combination of routing paths and dummy fill patterns that meet the timing requirements of an integrated circuit.

While the foregoing is directed to embodiments of the invention, other and further embodiments of the invention may be devised without departing from the basic scope thereof, and the scope thereof is determined by the claims that follow.

What is claimed is:

1. An integrated circuit, comprising:
   one or more signal routing paths for transferring signals; and
   a dummy fill pattern,
   wherein the one or more signal routing paths are formed based on one or more electrical characteristics of at least one of cells and one or more metal layers defined on the integrated circuit, wherein the dummy fill pattern is determined based on one or more metal density specifications and at least one design rule for reducing cross coupling capacitance between the dummy fill pattern and the one or more signal routing paths,
   wherein the design rule specifies:
      determination of a metal congestion level of a window of the integrated circuit, wherein the window is a defined region of the integrated circuit;
      upon determining that the metal congestion level satisfies a threshold, formation of electrically connected, aligned rectangular dummy fill structures at available locations within the window; and
      upon determining that the metal congestion level does not satisfy the threshold, formation of floating, staggered rectangular dummy fill structures at available locations within the window.

2. The integrated circuit of claim 1, wherein the metal congestion level is determined by the number of cells within the window, wherein a cell defines a region smaller than the region of the window in which a distinct component of the integrated circuit lies.

3. The integrated circuit of claim 1, wherein the aligned fill structures are arranged in a plurality of rows, wherein each of the aligned fill structures in each of the plurality of rows are spaced apart a same distance and respective ends of a first one of the aligned fill structures are aligned with respective ends of a second one of the aligned fill structures in an adjacent row.

4. The integrated circuit of claim 3, wherein each of the aligned dummy fill structures is electrically connected to one of a power source and ground.

5. The integrated circuit of claim 1, wherein the staggered dummy fill structures are equidistant, rectangular fill structures arranged according to a repeating pattern on a plurality of parallel planes, wherein respective major axes of the fill structures are parallel to one another and wherein the fill structures of each plane are staggered relative to the fill structures of any adjacent plane so that openings between fill structures are misaligned relative to opening of any adjacent.

6. The integrated circuit of claim 5, wherein each of the staggered fill structures is electrically floating.

7. An integrated circuit, comprising:
one or more signal routing paths for transferring signals; and
a dummy fill pattern,
wherein the one or more signal routing paths are formed based on one or more electrical characteristics of at least one of cells and one or more metal layers defined on the integrated circuit, wherein the dummy fill pattern is determined based on one or more metal density specifications and at least one design rule for reducing cross coupling capacitance between the dummy fill pattern and the one or more signal routing paths,
wherein the design rule specifies:
determination of a metal congestion level of a window of the integrated circuit, wherein the window is a defined region of the integrated circuit;
upon determining that the metal congestion level satisfies a threshold, formation of electrically connected, aligned rectangular dummy fill structures at available locations within the window, the aligned fill structures are arranged in a plurality of rows, wherein each of the aligned fill structures in each of the plurality of rows are spaced apart a same distance and respective ends of each of the aligned fill structures are aligned with respective ends of a neighboring one of the aligned fill structures in an adjacent row; and
upon determining that the metal congestion level does not satisfy the threshold, formation of plurality of equidistant, rectangular fill structures at available locations within the window, the plurality of fill structures are arranged according to a repeating pattern on a plurality of parallel planes, wherein respective major axes of the plurality of fill structures are parallel to one another and wherein the plurality of fill structures of each plane are staggered relative to the plurality of fill structures of any adjacent plane so that openings between the plurality of fill structures are misaligned relative to opening of any adjacent plane.

8. The integrated circuit of claim 7, wherein the metal congestion level is determined by the number of cells within the window, wherein a cell defines a region smaller than the region of the window in which a distinct component of the integrated circuit lies.

9. The integrated circuit of claim 7, wherein each of the aligned dummy fill structures is electrically connected to one of a power source and ground.

10. The integrated circuit of claim 7, wherein each of the plurality of fill structures is electrically floating.

* * * * *